United States Patent [19]
Boetsch et al.

[11] Patent Number: 4,901,566
[45] Date of Patent: Feb. 20, 1990

[54] AIR-FLOW AND DIRECTION SENSOR WITH AN ELECTROMAGNETIC DAMPING AND POSITIONING SYSTEM

[75] Inventors: Antoine Boetsch, Paris; Denis Chabanas, Fresnes, both of France

[73] Assignee: Thomson-CSF, Paris, France

[21] Appl. No.: 301,987

[22] Filed: Jan. 26, 1989

[30] Foreign Application Priority Data

Jan. 26, 1988 [FR] France ............................ 88 00834

[51] Int. Cl.$^4$ ............................................. G01C 21/00
[52] U.S. Cl. ......................................... 73/180; 73/188
[58] Field of Search ........................... 73/180, 188, 189

[56] References Cited

U.S. PATENT DOCUMENTS

| | | | |
|---|---|---|---|
| 2,918,817 | 12/1959 | Hughes, Jr. et al. | 73/180 |
| 3,534,600 | 10/1970 | Eichweber et al. | 73/180 |
| 3,882,721 | 5/1975 | Neary et al. | 73/188 |

FOREIGN PATENT DOCUMENTS

| | | |
|---|---|---|
| 1600479 | 9/1970 | France. |
| 2010490 | 8/1971 | France. |
| 2073471 | 10/1971 | France. |

*Primary Examiner*—Donald O. Woodiel
*Attorney, Agent, or Firm*—Cushman, Darby & Cushman

[57] ABSTRACT

This invention describes an angle of attack sensor for aeronautical use fitted with an electromagnetic device to damp the movement of the rotable part of the sensor and, when required, to position the moving part for test purposes. The damper comprises:

a rotor, attached to the moving part and carrying permanent magnets;

a stator, attached to the fixed part of the sensor and containing conductors, wrapped into notches, and a ferromagnetic casing placed in front of the notches.

The rotor movement is damped by eddy currents generated in the casing when the rotor turns. The rotor is positioned, for test purposes, by the field generated by the stator windings when power is fed to them.

12 Claims, 6 Drawing Sheets

AIR-FLOW AND DIRECTION SENSOR WITH AN ELECTROMAGNETIC DAMPING AND POSITIONING SYSTEM

FIELD OF THE INVENTION

This invention concerns sensors to detect the direction of air flow around an aircraft. More specifically, it applies to an electromagnetic device to damp the movement of the sensor rotor and, when necessary, to allow the rotor to be positioned for test purposes.

This type of sensor is used to measure the incidence of an aircraft, i.e. the angle between the aircraft longitudinal centerline and the direction of air flow in a plane normal to the aircraft plane (the aircraft plane being that which contains the longitudinal centerline and the wings of the aircraft) or its sideslip angle, i.e. the similar angle relative to the aircraft plane. For reasons of clarity, only aircraft angle of incidence sensors, also known as "angle of attack sensors" will be considered here although the invention is applicable to any type of air flow direction sensor.

DESCRIPTION OF THE PRIOR ART

An angle of attack sensor generally comprises:

a rotable part which aligns with the mean direction of the incident air flow and thus forms the sensor element proper;

a fixed part, mounted on the aircraft, which forms the datum for the measurement of the previous rotation.

This type of sensor must satisfy a number of requirements. Firstly, it must measure the angle of incidence accurately: this is a vital factor for the aircraft pilot. Secondly, it must be extremely reliable to satisfy the very stringent safety requirements of aeronautical applications. Finally, as for all aircraft equipment, it must be as light and compact as possible.

In addition, the rotable part can be subject to rotary oscillation both when the angle of incidence is stable and before reaching its final position when the angle has changed. The sensor must, therefore, be fitted with a damper to obtain, quickly and at any time, a stable electrical signal accurately representing the angle of incidence.

Various solutions, generally hydraulic or pneumatic, are currently used to achieve damping.

Hydraulic damping devices require seals on the rotable part shaft and these inevitably generate friction and, therefore, a "dry friction torque". This torque opposes the rotational movement and is virtually independent of its speed. It therefore reduces both the accuracy and sensitivity of the rotable part since this dry friction torque is applied to the rotable part shaft and thus reduces the accuracy with which the rotable part aligns with the air flow, i.e. the accuracy with which the angle is measured. In addition, it also reduces the sensor sensitivity since the rotable part must generate a higher turning torque to rotate the shaft. Hydraulic dampers also have a disadvantage in that the viscous damping factor, i.e. the way in which the damping force varies with speed, varies with change in the viscosity of the liquid, i.e. changes in temperature. Since aircraft are exposed to extreme changes in temperature between ground level and cruise altitude, variations in the viscous damping factor appreciably modify the sensor response during a fast change in the angle of incidence. Finally, the reliability of this type of instrument is suspect since leaks tend to occur after a certain time in service.

Pneumatic dampers use a gas, generally air, as the damping fluid. They normally operate at atmospheric pressure and require no seals between the rotable part and fixed part an advantage over hydraulic dampers. However, the specific weight of air varies considerably with aircraft altitude, causing a corresponding variation in the viscous damping factor, whose extreme values can differ in the ratio 1 to 5. Moreover, since the damping force is normally generated by throttling the air through a very narrow gap, dimensional differences in the parts concerned, inevitable during manufacture, lead to large variations in the damping factors from one damper to another.

In addition, it is necessary to add a system to accurately position the rotable part for test purposes. The sensor is tested using a device known as a "positioner" which turns the rotable part to one or several predetermined angular positions; the signal is then measured to ensure that the readings accurately represent these predetermined positions. The "positioner" is generally an electromechanical device coupled to the rotable part shaft through clutch means such that, during normal operation, the additional friction introduced by this test device, is eliminated. However, devices of this type are complex and bulky, particularly due to the presence of the clutch, and not always reliable.

SUMMARY OF THE INVENTION

An object of this invention is an angle of incidence sensor in which an electromagnetic device produces the damping force such that dry friction and/or unwanted torque is minimized.

A further object of the invention is an angle of incidence sensor in which the damping device further works as positioning means.

An air flow direction sensor for measuring the angle of an aircraft, said sensor comprising:

a part mounted on a shaft, forming a moving assembly which is free to rotate about said shaft centerline, said moving assembly being capable of aligning itself with said air flow direction;

a fixed part to be mounted on said aircraft;

means to measure the rotation of said moving assembly relative to said fixed part;

means to damp the movement of said moving assembly, comprising:

a rotor, produced from ferromagnetic material and mounted on said shaft;

means, mechanically mounted on said rotor, to generate a staggered magnetic field;

a stator, produced in ferromagnetic material and mounted on said fixed part;

electrical conductor means, mechanically mounted in said stator and placed in said magnetic field, thereby said magnetic field, when the rotor turns, generates a torque in said conductor means which opposes the movement of said rotor, said torque being substantially proportional to the angular speed of said rotor, thus damping the rotor movement.

means for positioning said moving assembly in a defined position, said positioning means comprising conductive wires carried by notches provided in the stator, said wires forming at least one phase and a pair of poles, thereby a current passing through said conductor sets the rotor and, consequently, the moving assembly, to a predetermined position.

Other items, special features and advantages of the invention will be shown by the following description, illustrated by the appended drawings. These drawings show.

Each reference number refers to the same component on all figures.

Figure 1:
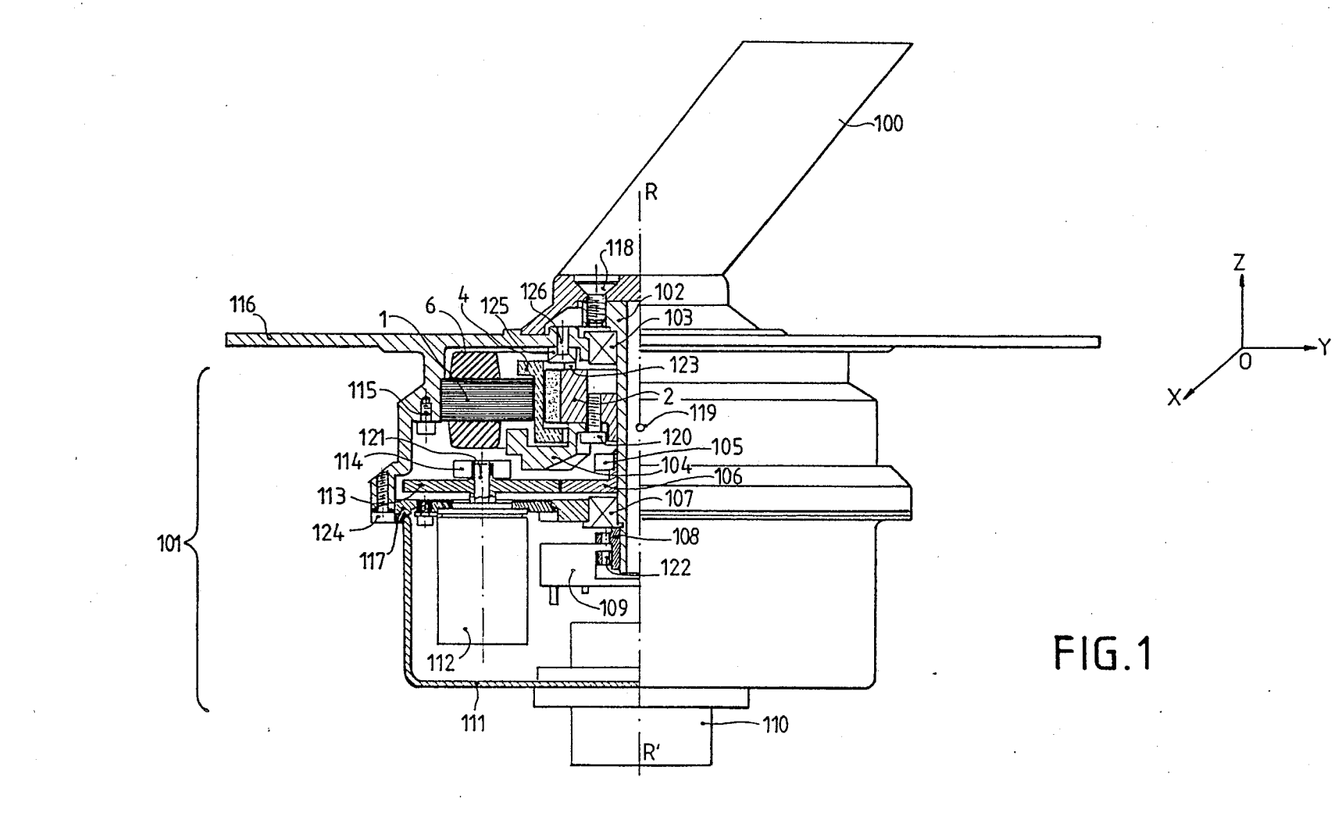
FIG. 1: the general arrangement of a complete angle of incidence sensor as per this invention.

FIG. 1, therefore, shows an embodiment of an angle of incidence sensor as per the invention, set in a plane YOZ.

The sensor is actuated by a first part 100 which rotates about a centerline RR' parallel to the OZ axis. This rotable part forms the sensing part since it aligns with the air flow. It can be one of several conventional types, for example a pressure tube containing several pressure tappings and pivoting about its longitudinal centerline RR' under the effect of differential pressure. Part 100 can also be a fin, or vane, as shown on the figure. For clarity, component 100 will be assumed to be a vane throughout the following description.

The sensor includes a second part, item 101, located inside the aircraft and mounted flush with the fuselage in plane XOY, perpendicular to the plane of the figure. Only the part to the left of centerline RR' is shown in section on the figure.

Vane 100 is attached, for example by screws (118), to the shoulder on rotating shaft 102. This shaft should preferably be cylindrical and hollow. It is free to rotate in two bearings 103 and 107, for example collar bearings. The outer races of these two bearings are mounted respectively in item 116, designated the body, and in a second component, item 117, designated the rear flange. Body 116 is extended in the XOY plane to allow mounting on the aircraft fuselage.

The following components are mounted on shaft 102 between these two bearings 103 and 107:

damping device component 2, described below. This can be mounted, for example, by pins in a hole 119 in shaft 102, perpendicular to its centerline (RR'). Item 2 includes a stop 123 which, therefore, rotates with shaft 102 and vane 100. The contact between this stop 123 and a stop 125 mounted on body 116 (for example by screw 126) limits the movement of the vane;

counterweight 104 used to statically balance the rotable assembly. This can be mounted on shaft 102, for example, by item 2 (screw 120);

a central gear, item 106, mounted, for example, by a clamp 105;

a nut, item 108, mounted on the opposite end of the shaft to vane 100, abuts against bearing 107 and prevents axial movement of shaft 102.

The aircraft internal assembly 101 also includes:

items 1, 4 and 6 which complete the damper described below; these parts are mounted in body 116, for example by a screw item 115;

means 112 to measure the angle of rotation of the vane about centerline RR'. These means are, for example, a brushless resolver with a transformer. Its drive shaft 121 could be coupled to shaft 102 by a gear wheel 113 attached, for example, by collar 114 and meshing with central gear 106. The resolver 112 is mounted on the rear flange 117 (for example by screws);

means 109 to feed electrical power to vane 100 to provide de-icing heating. Means 109, for example, consist of a slipring with flexible brushes. The rotating slipring is mounted on shaft 102 and held against nut 108 by, for example, nut 112. The slipring stator is mounted on rear flange 117 (attachment not shown on the figure). The conductors (not shown) run from the slipring 109 through shaft 102 to vane 100;

a connector 110 for the external power supply. This also form the connection (not shown) for each of the sensor electrical components. It is mounted on a cover 111, which encloses the lower section, itself mounted on rear flange 117 (for example by screw 124).

Figure 2:
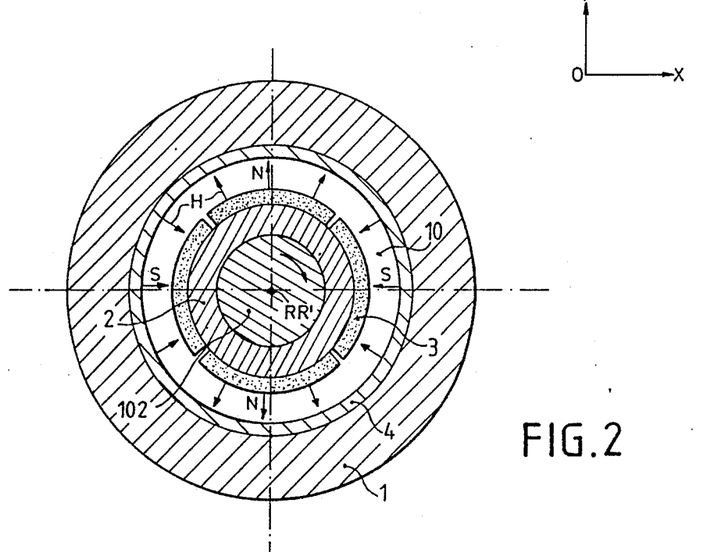
FIG. 2: an embodiment an electromagnetic damping device as per this invention.

FIG. 2 shows a cross section, in plane XOY, of an embodiment of the electromagnetic damping device as per this invention.

This device comprises a rotating part, mounted on shaft item 102 in the previous figure, itself driven by the vane 100. A fixed part is mounted around the above rotating part.

The rotating part consists of an annular component 2 or rotor, in ferromagnetic material. The assembly is mounted on shaft 102 (shown in this figure and following figures as a solid component for reasons of clarity), for example by the hole and pin described in FIG. 1 (not shown here). Rotor 2 carries means to generate a radial staggered magnetic field, i.e. one whose direction changes around the rotor circumference in the plane of the figure. This field is represented by arrows H. The means may consist of conductive coils or magnets. FIG. 2 shows a set of permanent magnets, items 3, mounted around the circumference of the rotor 2. The example in the figure shows them forming four poles, i.e. two North poles (N) parallel to OY and two South poles (S) perpendicular to OY.

The damper fixed part includes part 1 or stator, attached to the sensor fixed part as shown, for example, in FIG. 1. Stator 1 is also annular and in ferromagnetic material. Rotor 2 and stator 1 are coaxial (centerline RR'). An electrically conductive part, item 4, called tubular casing, is mounted in the inner face of the stator 1, i.e. the face which lies opposite the rotor. An air gap 10 exists between the moving assembly (rotor 2 and magnets 3) and the fixed part (stator 1 and socket 4).

The device operates as follows. If casing 4 is not mounted, rotor 2 rotates freely with vane 100. When casing 4 is fitted and rotor 2 turns, the magnetic field in the air gap 10 rotates at the same speed as the rotor. Casing 4 then lies in a rotating magnetic field which generates eddy currents in it, thus generating a torque which opposes the rotor movement. This torque is sensibly proportional to the speed of rotation of the field and, therefore, that of the rotor and vane mounted on it. This opposing torque only exists if the rotor turns and is proportional to the speed of rotation: it is a "viscous damping torque".

To minimize unwanted effects, the ferromagnetic material used has very high magnetic permeability and the lowest possible anisotropy and hysteresis losses. Hysteresis losses, in particular, give rise to a virtually constant resistive torque which opposes the torque that rotates the inductor (rotor 2) relative to the induced circuit (stator 1): it is similar to dry friction torque. However, as stated earlier, this dry friction torque reduces both the accuracy and sensitivity of the sensor. For example, the dry friction torque must be less than 0.005 Nm to achieve sensitivity of approx 0.1° at 125 knots (air flow speed). In this invention, the ferromagnetic materials used are iron-nickel alloys containing 48% nickel or iron-nickel-molybdenum alloys containing 80% nickel and 5% molybdenum. These materials give hysteresis losses of approx. 35 J.m$^{-3}$/cycle or less and coercive fields of 3.5 A/m or less.

Figure 3A:
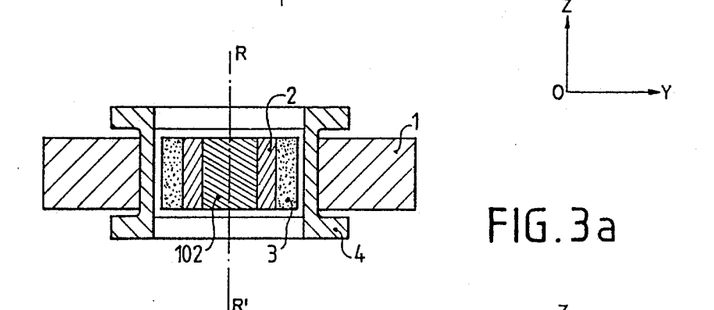
FIGS. 3a and 3b: variant embodiments of the damper shown in the previous figure.
Figure 3B:
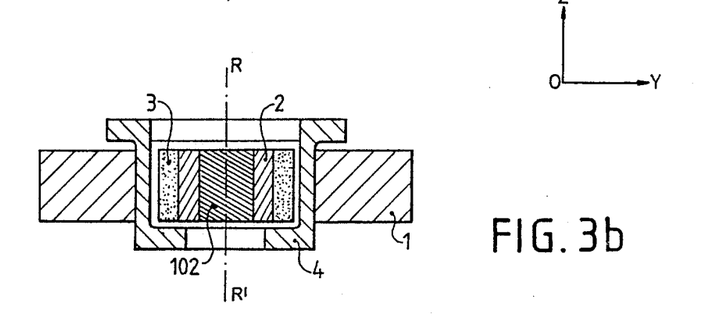

FIGS. 3a and 3b show two variant embodiments of the tubular casing 4 in FIG. 2. These are shown in section on plane ZOY.

These figures, therefore, show the moving assembly comprising rotor 2 and magnets 3 mounted on shaft 102 and the fixed part consisting of stator 1 and casing 4. However, the ends of casing 4 are flanged, in different ways, to significantly increase the viscous damping torque.

FIG. 3a, as an example, shows casing 4 with two flanges on either side of stator 1, such that each half-section is substantially U-shaped.

FIG. 3b shows another variant of casing 4 in which the half-section is substantially Z-shaped. It is this embodiment of casing 4 which is shown in FIG. 1.

Figure 4A:
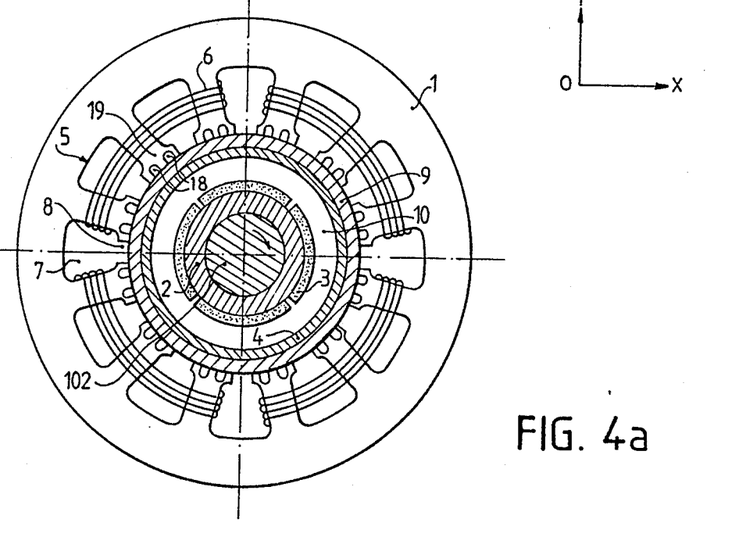
FIGS. 4a, 4b and 4c: an embodiment of the electromagnetic damper and positioner as per this invention.
Figure 4B:
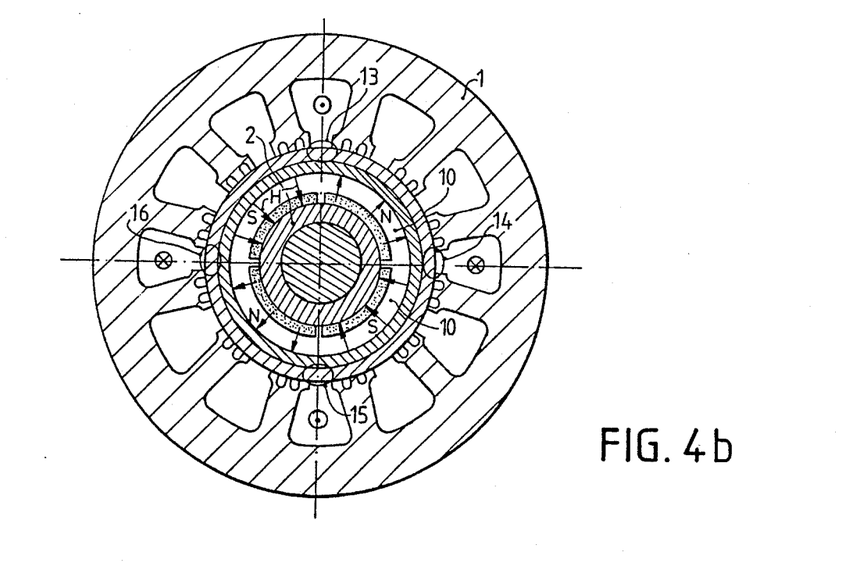
Figure 4C:
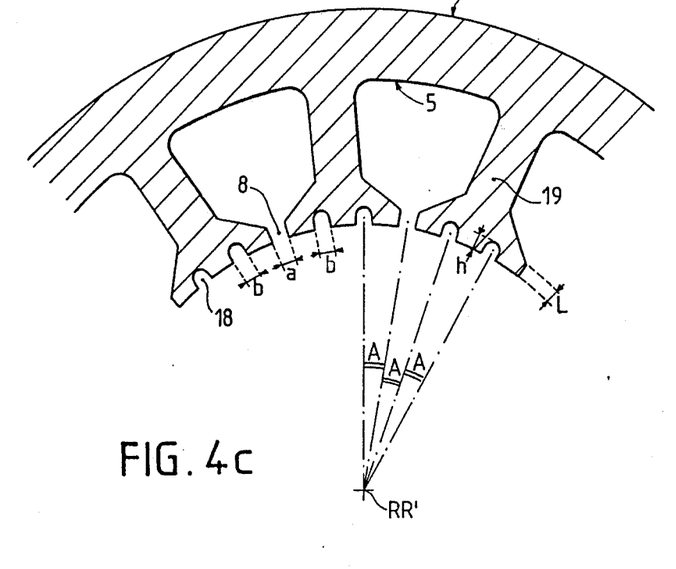

FIGS. 4a, 4b and 4c are cross-sections in plane XOY showing a general arrangement of the angle of incidence sensor electromagnetic damping and positioning device as per this invention.

FIG. 4a shows shaft 102, rotor 2, magnets 3, air gap 10, casing 4 and stator 1.

However, the form of the stator has been modified. It is still annular in shape but now includes notches 5 (for example 12 notches) which form teeth 19 between them. Conductive wires 6 are wound into these notches, around one or several teeth, to form one or several phases and one or several pairs of poles. This figure, as an example, shows one phase only, i.e. the windings consist or the same conductor or several conductors, in parallel, connected across the input terminals, forming two pairs of poles, i.e. two pairs of separate windings. Each notch 5 has a section 7 sufficiently wide to contain conductors 6, and an opening or slot 8 on the internal face of the stator. This opening is narrower than section 7 to minimize variations in reluctance at the notch positions. The device further includes a ferromagnetic liner, item 9, between casing 4 and stator 1; the purpose of this liner is described later. Finally, although shown in cross-section, stator 1 is not cross-hatched on FIG. 4a to clarify the drawing.

FIG. 4b shows the same arrangement as FIG. 4a but in simplified form, i.e. in particular, conductors 6 are eliminated and the field and current directions are indicated when the device is in operation, to clarify the explanations.

This figure shows, as an example, a rotor with two pole pairs. The current directions are conventionally represented either by a dot in a circle or by a cross in a circle to show when the current is flowing into or out of the figure. It also shows the rotor in a stable position and the direction of the field in air gap 10, indicated by arrows H.

When current is fed to one or several stator phases (only one phase in this figure), liner 9 is magnetically saturated in certain zones (items 13, 14, 15 and 16) opposite notches 5 which contain the conductors. Stator 1 then reacts as a conventional motor with the four notches in zones 13–16 open. Rotor 2 turns to align on the closest stable angular position defined by the configuration of the strong fields. Any deviation of rotor 2 from its stable position(s) generates a strong torque which returns it to its equilibrium position. The device therefore operates as a positioner.

To set to another angle (or several other angles), one or several separate windings are wrapped into the notches and connected to one or several separate pairs of terminals, each corresponding to a different equilibrium position. The operator can therefore select an angle simply by selecting a pair of terminals.

If there is no current in conductors 6, the device operates as a damper, as described for FIG. 2.

This device can operate as a damper in which unwanted opposing torque is minimized, as described previously, but also as a positioner. This second function simply requires additional windings but no clutching system and, therefore, does not increase friction and/or unwanted torque.

FIG. 4a also shows that a number of small grooves, item 18, have been produced in teeth 19; this minimizes the unwanted notch hooking torque as explained below.

If liner 9 and small grooves 18 were not present and if openings 8 were not skewed, i.e. if they were parallel to the axis of rotation RR', the notches and the magnetic field created by the rotor would generate a high unwanted torque which would tend to "hook" the rotor to the notches when it rotated relative to the stator. The reason for this hooking torque is that the reluctance of the magnetic circuit in the air gap varies considerably at the position of each notch. This creates preferred rotor positions and the rotor no longer rotates freely; this torque therefore shifts the vane equilibrium position and interferes with the measured value of the angle of incidence. This hooking torque can be up to 0.04 Nm, which is incompatible with the accuracy with which the angle of incidence must be measured.

The skewing method is applied, either to the rotor or to the stator or to both, to reduce this unwanted torque: openings 8 are no longer made parallel to the axis of rotation RR' but lie along a helix whose pitch and angle are selected such that the end of one opening is aligned (on RR') with the start of the next opening. The helix angle is, therefore, 360° divided by the number of notches. FIGS. 4a shows twelve notches and the helix angle is, therefore, 30°. This is an excessively high value because, since the sensor must be as compact as possible, the length of the rotor (parallel to OZ) is kept as short as possible; a typical length is approx one centimeter. It is technologically very difficult to produce helical openings at such a high angle of twist on such short parts.

Small grooves 18, for example two grooves per tooth, are therefore produced to reduce the helix angle. In the example shown in FIG. 4a, this divides the helix angle by three, i.e. the new angle is 10°. This makes it possible to reduce the hooking torque by a factor of 10, i.e. to 0.004 Nm in the above example.

Adding a ferromagnetic liner, such as liner 9, which masks the openings 8 and 18 from the rotor, considerably reduces the variations in reluctance around the stator. The thickness of liner 9 must be such that it is not saturated by the flux generated by the rotor but can be easily saturated, level with openings 8, by the field generated by the winding to allow operation as a positioner. In addition, for the same reasons as for stator 1, the material used for liner 9 must have high-magnetic permeability, must be as isotropic as possible and must generate minimum hysteresis losses. The use of the skewed openings 8 and grooves 18 described above and a liner 9 gives a hooking torque which is further reduced by a factor of 10, i.e. to 0.0004 Nm in the above example. This gives the degree of accuracy required for the angle of incidence sensor.

FIG. 4c, shows a part-section of stator 1 in plane XOY. This highlights the notches 5, grooves 18 and openings 8.

This figure shows that the angle between two successive openings or grooves 8 or 18 is always constant at A. In addition, the width of grooves 18, measured around the internal circumference of stator 1, is constant at b. The depth of grooves 18 is also constant at h. The Inventor's calculations and experience show that operation is satisfactory when the width (b) of grooves 18 is similar to that (a) of openings 8 and their depth (h) is approximately equal to that (L) of openings 8.

Figure 5:
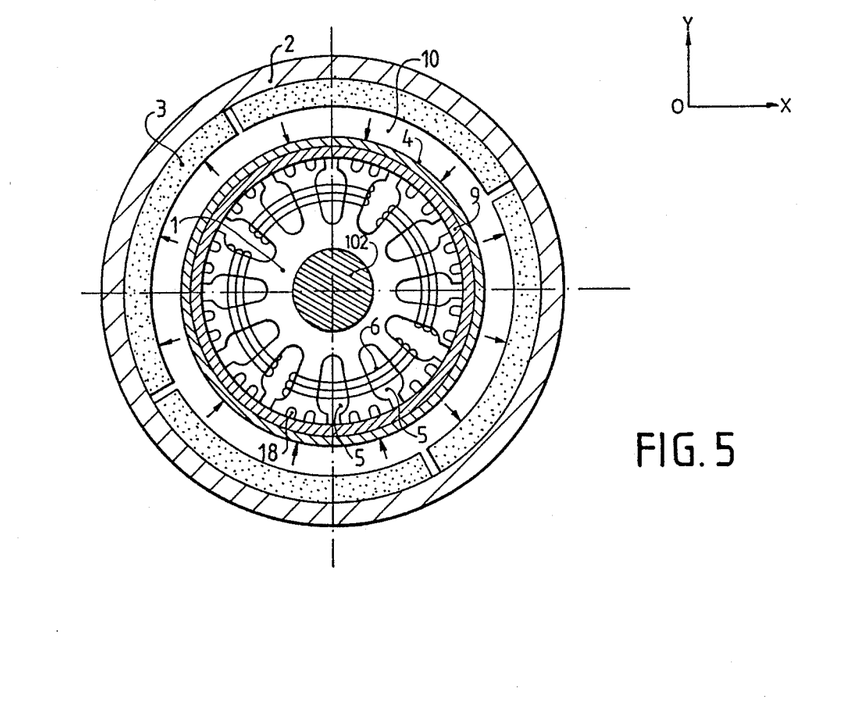
FIG. 5: another embodiment of the damper and positioner as per this invention.

FIG. 5 shows another embodiment of the sensor damping and positioning device as per this invention. The view is a section in plane XOY.

In this variant, the position of the fixed and moving assemblies are inverted. Rotor 2 and magnets 3 now surround the internal stator 1. There is still a ferromagnetic liner 9 and a conductive casing 4 around the periphery of stator 1.

The operation of this device is identical to that described above.

Figure 6A:
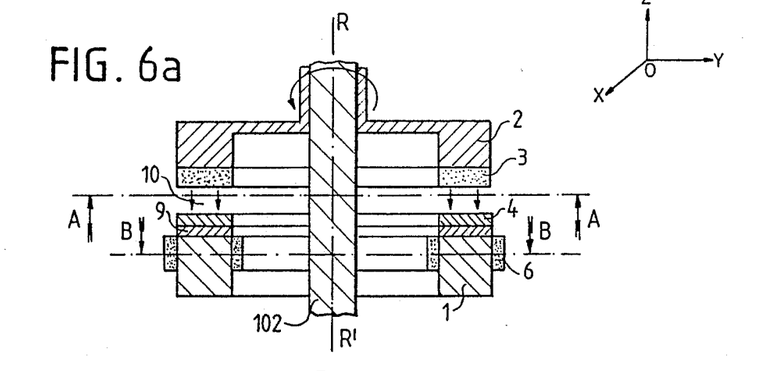
FIGS. 6a, 6b and 6c: another embodiment of the damper and positioner as per this invention.
Figure 6B:
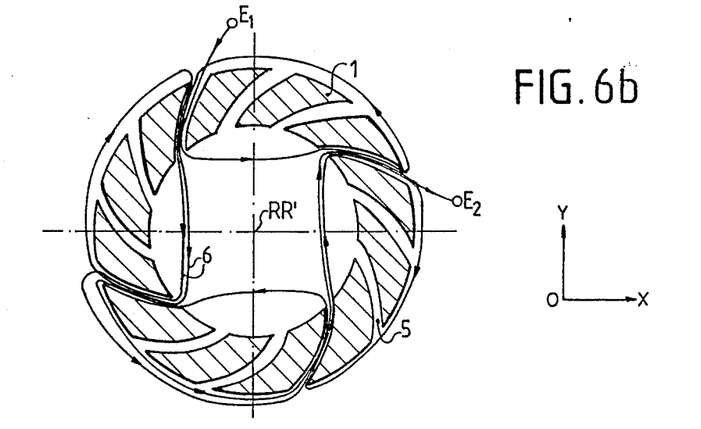
Figure 6C:
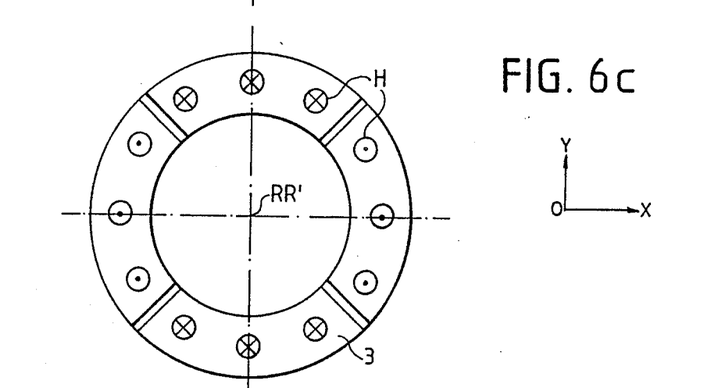

FIGS. 6, 6b and 6c represent another embodiment of the sensor damping and positioning device as per this invention.

In this variant, the magnetic field is axial, i.e. parallel to the centerline RR'. FIG. 6a shows a section on the device in the plane ZOY which contains the axis of rotation RR'. FIG. 6b shows a section on the same device on plane BB indicated in FIG. 6a, i.e. in a plane parallel to XOY. FIG. 6c shows a section of the device on plane AA indicate in FIG. 4a, i.e. in another plane parallel to XOY.

Here again, rotor 2, mounted on shaft 102, is a ferromagnetic ring and rotates about centerline RR'. Magnets 3 are mounted around the circumference of one face. The ferromagnetic annular stator 1 is centered on RR' and includes notches 5, at least some of which contain conductor 6 which is wound around the stator. The stator includes a ferromagnetic disk, analogous to liner 9, and a second ring in electrically conductive material, analogous to casing 4. These lie opposite the rotor and thus limit air gap 10.

FIG. 6b is a section, on plane BB, through stator 1. It shows the winding of conductors 6 for one phase. $E_1$ and $E_2$ represent the power supply terminals to the winding.

FIG. 6c is a section on plane AA, i.e. in air gap 10. It shows a particular configuration of magnets forming two pairs of poles. The direction of induction (arrows H) is shown in the same way as previously.

To simplify the drawings, shaft 102 has been omitted from FIGS. 6b and 6c.

Notches 5 in FIG. 6b are skewed for the same reasons as explained for FIG. 4. However, there is no technological difficulty in producing the skewed notches in this variant and high helix angles can be produced; this eliminates the need for small grooves, analogous to 18 in FIG. 4.

Figure 7A:
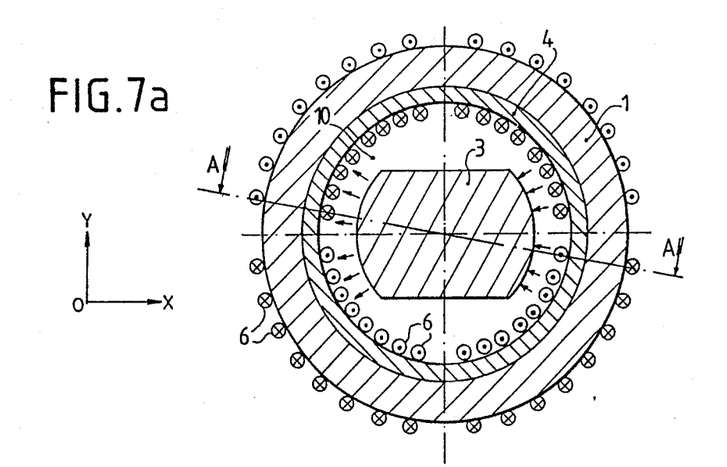
FIGS. 7a, 7b and 7c: another embodiment of the damper an positioner as per this invention.
Figure 7B:
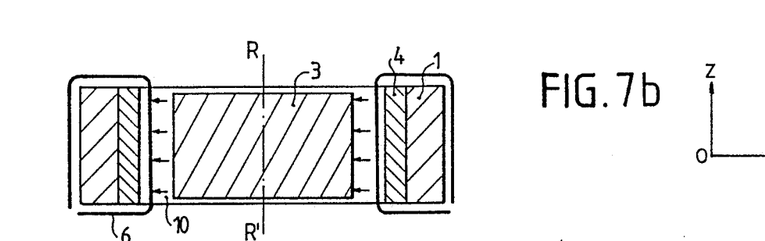
Figure 7C:
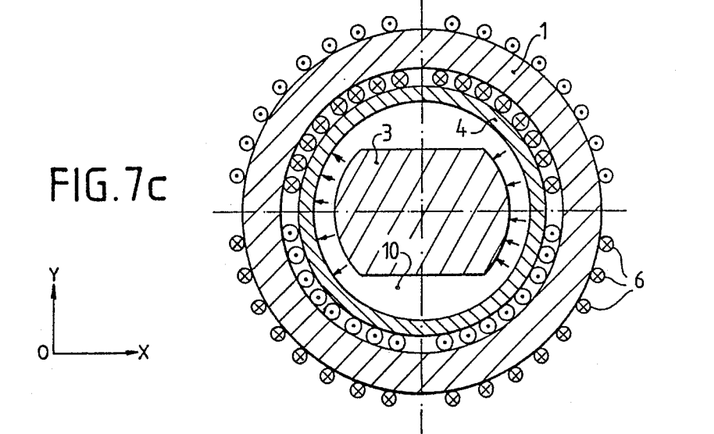

FIGS. 7a, 7b and 7c show another embodiment of the angle of incidence sensor damping and positioning device as per this invention.

This variant uses the basic structure of a permanent-magnet torque motor.

FIG. 7a is a section in plane XOY. It shows the annular stator 1, with no notches, wound to form a Gramme ring. This is more clearly shown on FIG. 7b, which is a section on plane AA in FIG. 7a, i.e. parallel to plane YOZ. Each conductor 6 encircles ring 1. The device further includes casing 4 in a conductive material; this can equally well be placed in the space between ring 1 and conductors 6, as shown on FIGS. 7a and 7b, or outside this space as shown on FIG. 7c. FIG. 7c is also a section in plane XOY and shows a variant of the device illustrated in FIG. 7a. In this case, the inductor includes one or several magnets 3 which are mounted on the shaft 102 (not shown). In this example, only a single pair of poles have been shown in the stable position during operation as a positioner. Items 1 and 3 are concentric. The current and magnetic field directions have also been represented in the same way as previously.

To obtain other stable positions it is simply necessary to add other phases to ring 1.

We have now described an angle of incidence sensor with an electromagnetic damping device; provided additional conductors are added to the stator, the damper device also operates as a positioner. These means satisfies all the constraints imposed by an angle of incidence sensor, i.e.:

it is accurate and sensitive since the damping force and the positioning force are generated electromagnetically with minimized dry friction and/or unwanted torque;

it is reliable since it uses no degradable fluids nor delicate clutch mechanism;

it is light and compact, particularly since the same device can fulfil both functions.

We claim:

1. An air flow direction sensor for measuring the angle of an aircraft, said sensor comprising:
    a part mounted on a shaft, forming a moving assembly which is free to rotate about said shaft centerline, said moving assembly being capable of aligning itself with said air flow direction;
    a fixed part to be mounted on said aircraft;
    means to measure the rotation of said moving assembly relative to said fixed part;
    means to damp the movement of said moving assembly, comprising:
        a rotor, produced from ferromagnetic material and mounted on said shaft;
        means, mechanically mounted on said rotor, to generate a staggered magnetic field;
        a stator, produced in ferromagnetic material and mounted on said fixed part;
        electrical conductor means, mechanically mounted in said stator and placed in said magnetic field, thereby said magnetic field, when the rotor turns, generates a torque in said conductor means which opposes the movement of said rotor, said torque being substantially proportional to the angular speed of said rotor, thus damping the rotor movement;

means for positioning said moving assembly in a defined position, said positioning means comprising conductive wires carried by notches provided in the stator, said wires forming at least one phase and a pair of poles, thereby a current passing through said conductor sets the rotor and, consequently, the moving assembly, to a predetermined position.

2. A sensor as claimed in claim 1, wherein said means to generate a magnetic field generator device comprises magnets placed around the periphery of said rotor.

3. A sensor as claimed in claim 1, wherein said magnetic field is radial to said shaft centerline and wherein said stator and rotor are formed by concentric rings.

4. A sensor as claimed in claim 3, wherein said stator is placed around said rotor.

5. A sensor as claimed in claim 1, wherein said rotor is placed around said stator.

6. A sensor as claimed in claim 3, wherein said conductor means form a ring mounted on the face of said stator which lies opposite said rotor.

7. A sensor as claimed in claim 6, wherein said ring has flanges, thereby increasing the damping torque.

8. A sensor as claimed in claim 1, wherein said stator and rotor are positioned perpendicular to said shaft centerline, one above the other, with said magnetic field parallel to said centerline.

9. A sensor as claimed in claim 1, wherein said notches have skewed openings.

10. A sensor as claimed in claim 1, wherein said stator further comprises small grooves equispaced between said notches.

11. A sensor as claimed in claim 1, further comprising a ferromagnetic liner placed on said stator to mask said notches and said grooves.

12. A sensor as claimed in claim 1, wherein said means to generate magnetic field form said rotor, said sensor further comprising at least one conductive wire wound around said stator.

* * * * *